(12) United States Patent
Sakata

(10) Patent No.: US 8,142,900 B2
(45) Date of Patent: Mar. 27, 2012

(54) LASER-WELDABLE RESIN COMPOSITION AND MOLDED PRODUCT

(75) Inventor: Koichi Sakata, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 399 days.

(21) Appl. No.: 12/440,528

(22) PCT Filed: Sep. 6, 2007

(86) PCT No.: PCT/JP2007/067412
§ 371 (c)(1),
(2), (4) Date: Mar. 9, 2009

(87) PCT Pub. No.: WO2008/032636
PCT Pub. Date: Mar. 20, 2008

(65) Prior Publication Data
US 2009/0324977 A1    Dec. 31, 2009

(30) Foreign Application Priority Data

Sep. 13, 2006  (JP) ................. 2006-247929

(51) Int. Cl.
*B32B 5/16* (2006.01)
*B32B 27/36* (2006.01)
*B32B 27/00* (2006.01)

(52) U.S. Cl. ......... 428/480; 428/327; 428/412; 428/500

(58) Field of Classification Search ........................ None
See application file for complete search history.

(56) References Cited

U.S. PATENT DOCUMENTS 7,652,079 B2 *  1/2010  Takayama et al. ............ 523/400
2005/0256275 A1 * 11/2005  Kobayashi et al. ........... 525/349

FOREIGN PATENT DOCUMENTS

| JP | 63-3055 | 1/1988 |
|---|---|---|
| JP | 7-16166 | 1/1995 |
| JP | 07-018166 | 1/1995 |
| JP | 2000-302824 | 10/2000 |
| JP | 2001-26656 | 1/2001 |
| JP | 2002-161200 | 6/2002 |
| JP | 2003-20389 | 1/2003 |
| JP | 2003-292752 | 10/2003 |
| JP | 2004-315805 | 11/2004 |
| JP | 2005-8681 | 1/2005 |
| JP | 2005-133087 | 5/2005 |

OTHER PUBLICATIONS

Translation of Written Opinion of the International Searching Authority, issued Mar. 17, 2009, with its Notification, mailed Mar. 26, 2009.
International Search Report for PCT/JP2007/067412, mailed Dec. 4, 2007.

* cited by examiner

*Primary Examiner* — Sheeba Ahmed
(74) *Attorney, Agent, or Firm* — Nixon & Vanderhye P.C.

(57) ABSTRACT

A laser-weldable polybutylene terephthalate-series resin composition having a high laser weldability, a high welding strength, and a high heat shock resistance is provided.

The laser-weldable PBT-series resin composition comprises (A) a polybutylene terephthalate-series resin and (B) a core-shell polymer (e.g., a core-shell polymer having an acrylic rubber as a core thereof), and if necessary (C) a filler or reinforcing agent (e.g., a glass fiber) and a polycarbonate-series resin. In the resin composition, the core-shell polymer (B) may usually have an average particle size of not less than 2 μm.

8 Claims, 1 Drawing Sheet

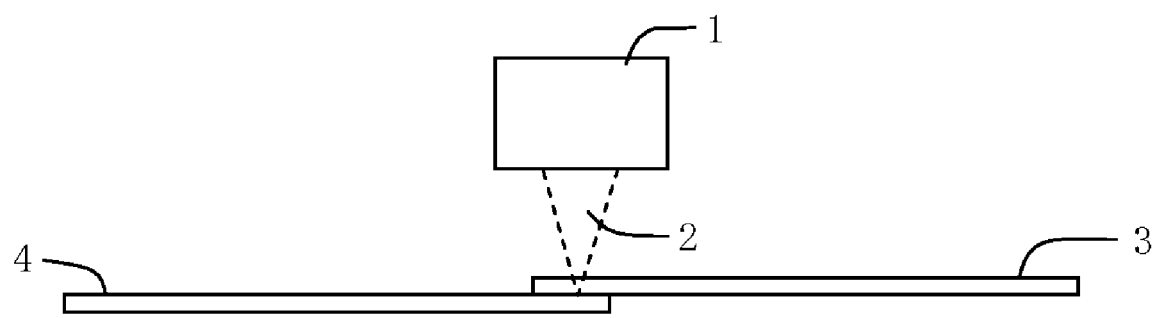

LASER-WELDABLE RESIN COMPOSITION AND MOLDED PRODUCT

This application is the U.S. national phase of International Application No. PCT/JP2007/067412, filed 6 Sept. 2007, which designated the U.S. and claims priority to Japan Application No. 2006-247929, filed 13 Sept. 2006, the entire contents of each of which are hereby incorporated by reference.

TECHNICAL FIELD

The present invention relates to a polybutylene terephthalate-series resin composition having a high laser weldability and an excellent heat shock resistance and a molded product using the composition.

BACKGROUND ART

A polybutylene terephthalate (PBT)-series resin is an engineering plastic having various excellent properties such as excellent mechanical properties, electric properties, and shaping processability (or moldability) and is used for a number of applications such as automotive parts and electric or electronic device parts. Moreover, the use of the PBT-series resin as an exterior package or a container material (a housing material) for protecting a substrate has shown an increase. In order to produce such parts, a plurality of molded components are bonded by using a bonding manner (or a bonding method) such as an adhesive, a screw cramp, a snap fit, a hot plate welding, or an ultrasonic welding. However, some problems of these bonding manners are pointed out. For example, in the use of an adhesive, the loss of time for curing of the adhesive, or the burden on the environment becomes a problem. Moreover, in a means using a screw cramp, the labor or the cost required for fastening increases. Further, since a hot plate welding or an ultrasonic welding gives vibration or heat necessary for welding to a product all over, there is a possible damage to the product due to heat or vibration. In contrast, a bonding (or joining) method by laser welding needs to melt only part to be welded of a product. Therefore, the method causes no damage to a product due to heat or vibration involved in the welding, and the welding process is also very simple. Thus, recently the laser welding method has been widely utilized and has attracted attention as a welding manner for various resin components or parts. Furthermore, a resin part (or member) having a metal part (or member) incorporated therein by insert-molding is also used as the resin parts to be subjected to welding. Accordingly, the development of a PBT-series resin having both insert-moldability and high laser-weldability as an insert-molding resin has been expected. Incidentally, the resin properties required for an insert-molded product includes high (or excellent) resistance to large temperature change over a long period of time (resistance to heat shock), that is, heat shock resistance.

It is indicated that the polybutylene terephthalate-series resin is carbonized without substantial laser-welding under laser irradiation due to its low laser transmissivity. Japanese Patent Application laid-Open No. 26656/2001 (JP-2001-26656A, Patent Document 1) discloses a process for producing a united molded product, which comprises uniting a molded product formed from a polyester-series copolymer having a melting point within a specific range with another molded product by a welding processing. This document mentions that a homopolybutylene terephthalate resin has a small laser-welding strength.

Moreover, examples using a polybutylene terephthalate-series resin composition for a metal insert molding are also known. For example, Japanese Patent Application Laid-Open No. 3055/1988 (JP-63-3055A, Patent Document 2) discloses an insert-molded product obtained by insert-molding of a resin composition comprising a polybutylene terephthalate and an acrylic rubber, and a metal or inorganic solid. This document mentions that the acrylic rubber is a rubber-like elastomer obtained by polymerization of an acrylic ester or copolymerization mainly using an acrylic ester and exemplifies a rubber-like polymer which is obtained by graft polymerization of a polymerizable monomer (such as methyl methacrylate) to a polymer obtained by polymerization of an acrylic ester (such as butyl acrylate) and a small amount of a crosslinkable monomer (such as butylene diacrylate). This document also mentions that commercial items, "Kane Ace FM" (manufactured by Kaneka Corporation), "VITAX V-6401" (manufactured by Hitachi Chemical Co., Ltd.), "METABLEN W-300" and "METABLEN W-530" (manufactured by Mitsubishi Rayon Co., Ltd.), and "Acryloid KM-323" and "Acryloid KM-330" (manufactured by Rohm and Haas Company) may be used. Incidentally, this document does not mention laser welding of the above-mentioned resin composition or insert-molded product at all. Even if the composition or product is subjected to laser-welding, it is substantially impossible to produce a laser-welded product because the composition or product has a remarkably low laser transmissivity.

Also, study is in progress to improve the heat shock resistance of a polyester-series resin composition. For example, Japanese Patent Application Laid-Open No. 18166/1995 (JP-7-18166A, Patent Document 3) discloses a thermoplastic polyester resin composition containing (A) 100 parts by weight of a thermoplastic polyester, (B) 5 to 100 parts by weight of a glass fiber, (C) 5 to 100 parts by weight of a glass bead, and (D) 5 to 50 parts by weight of an acrylic rubber. This document mentions that the acrylic rubber (D) is a copolymer of an acrylic ester and a methacrylic ester, the acrylic ester having a saturated or unsaturated straight chain or branched chain aliphatic hydrocarbon having 1 to 5 carbon atom(s) and the methacrylic ester having a saturated or unsaturated straight chain or branched chain aliphatic hydrocarbon group having 1 to 5 carbon atom(s). This document also describes that the brand name "PARALIOD EXL2311" (manufactured by Kureha Chemical Industry, Co., Ltd.) is used in Examples as the acrylic rubber. In addition, this document mentions that a thermoplastic polyester material which has an excellent mechanical property of the thermoplastic polyester and an excellent heat shock resistance is obtained and that the thermoplastic polyester material is effective in inserting or sealing a metal.

Incidentally, these documents have no assumption that these compositions are subjected to laser welding. Moreover, even if the polyester-series compositions described in these documents are subjected to laser-welding, there is a possibility that the compositions cannot substantially be laser-welded due to their low laser transmissivities.

Japanese Patent Application Laid-Open No. 315805/2004 (JP-2004-315805A, Patent Document 4) discloses a laser-weldable polybutylene terephthalate-series resin composition comprising (A) a polybutylene terephthalate-series resin and (B) an elastomer having a refractive index of 1.52 to 1.59. This document mentions that examples of the elastomer include a polystyrene-series elastomer, a polyester-series elastomer, a polyamide-series elastomer, a polyurethane-series elastomer, a polyolefinic elastomer, and others.

[Patent Document 1] JP-2001-26656A (Claims, and Paragraph number [0003])

[Patent Document 2] JP-63-3055A (Claims, and page 2, lower left column, line 12 to page 3, upper left column, line 14)

[Patent Document 3] JP-7-18166A (Claims, and Paragraph numbers [0009], [0018], and [0026])

[Patent Document 4] JP-2004-315805A (Claims, and Paragraph number [0066])

DISCLOSURE OF THE INVENTION

Problems to be Solved by the Invention

It is therefore an object of the present invention to provide a laser-weldable polybutylene terephthalate-series resin composition having an improved heat shock resistance without deterioration in laser weldability in the use of a polybutylene terephthalate-series resin as a base resin, and a molded product formed from the composition.

Another object of the present invention is to provide a laser-weldable polybutylene terephthalate-series resin composition which ensures high-level laser weldability and heat shock resistance without deterioration in properties of a polybutylene terephthalate-series resin, and a molded product formed from the composition.

Means to Solve the Problems

The inventors of the present invention made intensive studies to achieve the above objects and finally found that a combination use of a polybutylene terephthalate-series resin and a core-shell polymer, particularly dispersion of a core-shell polymer (to be dispersed) having a large particle size into a polybutylene terephthalate-series resin, maintains the properties of the polybutylene terephthalate-series resin and ensures both laser weldability and a high-level heat shock resistance in a well-balanced way. The present invention was accomplished based on the above findings.

That is, the laser-weldable (or laser-welding) polybutylene terephthalate-series resin composition of the present invention comprises (A) a polybutylene terephthalate-series resin and (B) a core-shell polymer. The polybutylene terephthalate-series resin (A) may comprise a homopolyester (a polybutylene terephthalate resin), a copolyester (a polybutylene terephthalate copolymer), or a mixture thereof (e.g., a mixture of the homopolyester and the copolyester). Incidentally, in the mixture, the mixture ratio of the homopolyester and the copolyester is not particularly limited to a specific one. The copolyester may comprise a resin modified with a copolymerizable monomer in a proportion of not more than about 45 mol % (for example, about 0.01 to 40 mol %), particularly not more than 30 mol % (for example, about 0.01 to 30 mol %). Moreover, the core-shell polymer (B) may be a core-shell polymer (an acrylic core-shell polymer) comprising a core (or a core layer) comprising an acrylic rubber.

In the resin composition of the present invention, the core-shell polymer (B) usually has a large particle size (for example, an average particle size of not smaller than 1 μm, and preferably not smaller than 2 μm). Use of a core-shell polymer having such a particle size can efficiently ensure both laser transmissivity and heat shock resistance of the resin composition. In the resin composition, the proportion of the core-shell polymer (B) may be about 1 to 50 parts by weight relative to 100 parts by weight of the resin (A).

Representative examples of the resin composition include a resin composition in which the core-shell polymer (B) has an average particle size of 3 to 10 μm, the proportion of the core-shell polymer (B) is 5 to 30 parts by weight relative to 100 parts by weight of the resin (A).

The resin composition may further contain (C) a reinforcing agent (e.g., a glass fiber). In the resin composition containing such a reinforcing agent, the proportion of the reinforcing agent (C) may be about 10 to 120 parts by weight relative to 100 parts by weight of the resin (A). Moreover, the resin composition may further contain a polycarbonate-series resin. In the resin composition containing such a polycarbonate-series resin, the proportion of the polycarbonate-series resin may be about 3 to 20 parts by weight relative to 100 parts by weight of the resin (A).

The present invention also includes a laser-transmittable resin molded product formed from the resin composition, that is, a laser-transmittable resin molded product that is able to be brought into contact with a laser-absorbable (or laser-absorbing) resin molded product and is laser-transmitted to be bonded to the laser-absorbable resin molded product, and that is formed from the resin composition.

The present invention also includes a composite resin molded product formed from the resin composition (a first molded product, a laser-transmittable resin molded product formed from the resin composition) and a resin molded product as a counterpart (a second molded product, that is, a molded product formed from a laser-absorbable resin). In the composite resin molded product, the first and second molded products are bonded together by a laser welding. Such a composite molded product may be produced by bringing the first molded product into contact with the second molded product (particularly, by bringing at least joining parts of both products into contact with each other), irradiating a laser beam on the contact surface between the first and second molded products to melt the contact surface between the first and second molded products at least partly and closely adhere the joining surface of these products.

Effects of the Invention

According to the present invention, the combination use of a polybutylene terephthalate-series resin and a core-shell polymer realizes an excellent heat shock resistance without deterioration in laser weldability even in the use of the polybutylene terephthalate-series resin as a base resin. Moreover, the present invention ensures high-level laser weldability and heat shock resistance without deterioration in properties of the polybutylene terephthalate-series resin. Therefore, the present invention ensures a molded product (for example, an insert-molded product) having a high laser weldability or a composite molded product bonded with a high welding strength.

BRIEF DESCRIPTION OF THE DRAWINGS

FIG. 1 is a schematic view for illustrating a laser welding in Examples.

DESCRIPTION OF REFERENCE NUMERALS

1 . . . . Light source
2 . . . . Laser beam
3 . . . . Test piece A
4 . . . . Test piece B

DETAILED DESCRIPTION OF THE INVENTION

[Polybutylene Terephthalate-Series Resin Composition]
(A) Polybutylene Terephthalate-Series Resin The polybutylene terephthalate-series resin (PBT-series resin) as a base resin may include a homopolyester (or a polybutylene terephthalate) or a copolyester (or a butylene terephthalate-series copolymer or a polybutylene terephthalate copolyester) containing a butylene terephthalate unit as a main unit (for example, in a proportion of about 50 to 100% by weight, preferably about 60 to 100% by weight, and more preferably about 75 to 100% by weight), and others.

In the copolyester (butylene terephthalate-series copolymer or modified PBT resin), the copolymerizable monomer (or comonomer) may include a dicarboxylic acid excluding terephthalic acid; a diol excluding 1,4-butanediol; a hydroxycarboxylic acid; a lactone; and others. The copolymerizable monomers may be used alone or in combination.

The dicarboxylic acid may include, for example, an aliphatic dicarboxylic acid (e.g., a $C_{4-40}$dicarboxylic acid such as succinic acid, glutaric acid, adipic acid, pimelic acid, suberic acid, azelaic acid, sebacic acid, undecanedicarboxylic acid, dodecanedicarboxylic acid, hexadecanedicarboxylic acid, or dimeric acid, preferably a $C_{4-14}$dicarboxylic acid), an alicyclic dicarboxylic acid (e.g., a $C_{8-12}$ dicarboxylic acid such as hexahydrophthalic acid, hexahydroisophthalic acid, hexahydroterephthalic acid, or himic acid), an aromatic dicarboxylic acid other than terephthalic acid (e.g., phthalic acid, isophthalic acid; a naphthalenedicarboxylic acid such as 2,6-naphthalenedicarboxylic acid; and a $C_{8-16}$diphenyldicarboxylic acid such as 4,4'-diphenyldicarboxylic acid, 4,4'-diphenyletherdicarboxylic acid, 4,4'-diphenylmethanedicarboxylic acid, or 4,4'-diphenylketonedicarboxylic acid), or a reactive derivative thereof [for example, a derivative capable of forming an ester (or an ester-formable derivative), e.g., a lower alkyl ester (e.g., a $C_{1-4}$alkyl ester of phthalic acid or isophthalic acid, such as dimethyl phthalate or dimethyl isophthalate (DMI)); an acid chloride; and an acid anhydride]. In addition, if necessary, a polycarboxylic acid (such as trimellitic acid or pyromellitic acid) may be used in combination with the dicarboxylic acid.

The diol may include, for example, an aliphatic diol other than 1,4-butanediol (for example, a straight chain or branched chain $C_{2-12}$alkanediol such as ethylene glycol, trimethylene glycol, propylene glycol, neopentyl glycol, hexanediol, octanediol, or decanediol, preferably a straight chain or branched chain $C_{2-10}$alkanediol), a (poly)oxyalkylene glycol [for example, a glycol having a plurality of oxy$C_{2-4}$alkylene units, e.g., diethylene glycol, dipropylene glycol, ditetramethylene glycol, triethylene glycol, tripropylene glycol, and a polytetramethylene glycol], an alicyclic diol (e.g., 1,4-cyclohexanediol, 1,4-cyclohexanedimethanol, and a hydrogenated bisphenol A), an aromatic diol [for example, a dihydroxy $C_{6-14}$arene such as hydroquinone, resorcinol, or naphthalenediol; a biphenol; a bisphenol compound; and xylylene glycol]. Further, if necessary, a polyol (such as glycerin, trimethylolpropane, trimethylolethane, or pentaerythritol) may be used in combination with the diol.

The bisphenol compound may include a bis(hydroxyaryl) $C_{1-6}$alkane such as bis(4-hydroxyphenyl)methane (bisphenol F), 1,1-bis(4-hydroxyphenyl)ethane (bisphenol AD), 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, or 2,2-bis(4-hydroxyphenyl)-4-methylpentane; a bis(hydroxyaryl)$C_{4-10}$cycloalkane such as 1,1-bis(4-hydroxyphenyl)cyclopentane or 1,1-bis(4-hydroxyphenyl)cyclohexane; 4,4'-dihydroxydiphenyl ether; 4,4'-dihydroxydiphenyl sulfone; 4,4'-dihydroxydiphenyl sulfide; 4,4'-dihydroxydiphenyl ketone; and an alkylene oxide adduct thereof. The alkylene oxide adduct may include a $C_{2-3}$alkylene oxide adduct of a bisphenol compound (for example, bisphenol A, bisphenol AD, and bisphenol F), e.g., 2,2-bis-[4-(2-hydroxyethoxy)phenyl]propane, diethoxylated bisphenol A (EBPA), 2,2-bis-[4-(2-hydroxypropoxy)phenyl]propane, and dipropoxylated bisphenol A. In the alkylene oxide adduct, the mole number of the added alkylene oxide (a $C_{2-3}$alkylene oxide such as ethylene oxide or propylene oxide) may be about 1 to 10 mol, preferably about 1 to 5 mol, relative to 1 mol of each hydroxyl group.

The hydroxycarboxylic acid may include, for example, a hydroxycarboxylic acid such as hydroxybenzoic acid, hydroxynaphthoic acid, hydroxyphenylacetic acid, glycolic acid, or hydroxycaproic acid, or a derivative thereof, and others. The lactone may include a $C_{3-12}$ lactone such as propiolactone, butyrolactone, valerolactone, or caprolactone (e.g., ε-caprolactone), and others.

The preferred copolymerizable monomer includes a diol [for example, a $C_{2-6}$alkylene glycol (e.g., a straight chain or branched chain alkylene glycol such as ethylene glycol, trimethylene glycol, propylene glycol, or hexanediol), a polyoxy$C_{2-4}$alkylene glycol having a repeating number of an oxyalkylene unit of about 2 to 4 (e.g., diethylene glycol), and a bisphenol compound (e.g., a bisphenol compound or an alkylene oxide adduct thereof)], a dicarboxylic acid [for example, a $C_{6-12}$aliphatic dicarboxylicacid (e.g., adipic acid, pimelic acid, suberic acid, azelaic acid, and sebacic acid), an asymmetrical aromatic dicarboxylic acid having two carboxyl groups at asymmetric positions of an arene ring thereof], and others. In these compounds, the preferred one includes an aromatic compound, for example, an alkylene oxide adduct of a bisphenol compound (particularly, bisphenol A), and an asymmetrical aromatic dicarboxylic acid [for example, phthalic acid, isophthalic acid, and a reactive derivative thereof (e.g., a lower alkyl ester such as dimethyl isophthalate (DMI))], and others.

The polybutylene terephthalate-series resin may be used alone or in combination. In the combination use, the homopolyester and the copolyester may be combined with each other, a plurality of copolyesters may be combined with each other, or the homopolyester and a plurality of copolyesters may be combined with each other.

The preferred polybutylene terephthalate-series resin includes the homopolyester (the polybutylene terephthalate) and/or the copolymer (the polybutylene terephthalate copolyester). The proportion of the copolymerizable monomer (the proportion of modification) may usually be not more than 45 mol % (e.g., about 0 to 40 mol %) and preferably not more than 35 mol % (e.g., about 0 to 35 mol %) or may be not more than 30 mol % (about 0 to 30 mol %). In the use of a single species of the copolymer, the proportion of the copolymerizable monomer in the copolymer may be selected from the range of, for example, about 0.01 to 30 mol %, and may usually be about 1 to 30 mol %, preferably about 3 to 25 mol %, and more preferably about 5 to 20 mol % (e.g., about 5 to 15 mol %).

Incidentally, in a combination use of the homopolyester and the copolyester, the mixture ratio is not particularly limited to a specific one.

The PBT-series resin may be obtained by copolymerizing terephthalic acid or a reactive derivative thereof and 1,4-butanediol and if necessary, a copolymerizable monomer, with a conventional manner, for example, transesterification, direct esterification, and others.

(B) Core-Shell Polymer

The core-shell polymer (core-shell elastomer) is a polymer having a multi-layered structure comprising a core layer (core) and a shell layer coating or covering part or all of the core layer (surface of the core layer). In the core-shell polymer, either the core layer or the shell layer comprises a rubber component (soft component), and the other comprises a hard component.

The core layer usually comprises a rubber component. The glass transition temperature of the rubber component may be, for example, lower than 0° C. (e.g., not higher than −10° C.), preferably not higher than −20° C. (e.g., about −180 to −25° C.), and more preferably not higher than −30° C. (e.g., about −150 to −40° C.).

The rubber component is not particularly limited to a specific one as long as the rubber component has such a low glass transition temperature as described above. For example, the rubber component may include a polymer of an unsaturated bond-containing monomer, a silicon-containing rubber (silicon-containing elastomer), and a urethane-series rubber. The rubber component may be used alone or in combination. In a combination use of two or more rubber components, these rubber components may bond together by copolymerization, graft polymerization, or others.

The unsaturated bond-containing monomer may include an acrylic monomer {for example, an acrylic ester [e.g., an alkyl acrylate (e.g., a $C_{1-20}$alkyl acrylate such as methyl acrylate, ethyl acrylate, propyl acrylate, butyl acrylate, isobutyl acrylate, hexyl acrylate, 2-ethylhexyl acrylate, or lauryl acrylate), and an aryl acrylate (e.g., phenyl acrylate)], and a methacrylic ester (e.g., an ester of methacrylic acid with a higher alcohol, such as lauryl methacrylate)}, a diene-series monomer (e.g., a conjugated $C_{2-6}$alkadiene such as butadiene, isoprene, or chloroprene), an olefinic monomer (e.g., a $C_{2-6}$alkene such as ethylene, propylene, 1-butene, or isobutylene), an aromatic vinyl-series monomer (e.g., a styrene-series monomer such as styrene, α-methylstyrene, vinyltoluene, butylstyrene, phenylstyrene, or chlorostyrene, and vinylnaphthalene), a vinyl cyanide-series monomer (e.g., (meth)acrylonitrile), a vinyl ether-series monomer, a vinyl carboxylate-series monomer (e.g., vinyl acetate), an acrylamide-series monomer (e.g., (meth)acrylamide), and a fluorine-containing monomer (e.g., vinylidene fluoride, perfluoropropene, and tetrafluoroethylene). These unsaturated bond-containing monomers may be used alone or in combination.

Representative examples of the polymer of the unsaturated bond-containing monomer may include an acrylic rubber (acrylic elastomer), a diene-series rubber (diene-series elastomer), an olefinic rubber (e.g., an ethylene-propylene rubber), and a fluorine-containing rubber (e.g., a vinylidene fluoride-perfluoropropene copolymer).

The acrylic rubber as the rubber component is a polymer containing an acrylic monomer as a main component. The acrylic monomer may include particularly an acrylic ester such as an alkyl acrylate (e.g., a $C_{1-12}$alkyl acrylate such as butyl acrylate, preferably a $C_{1-8}$alkyl acrylate, and more preferably a $C_{2-6}$alkyl acrylate). The acrylic rubber may be a homo- or copolymer of the acrylic monomer (for example, a copolymer of not less than two species of the acrylic monomer, a copolymer of the acrylic monomer and other unsaturated bond-containing monomer(s)) or a copolymer of the acrylic monomer (and other unsaturated bond-containing monomer(s)) and a crosslinkable monomer.

The crosslinkable monomer may include, for example, a (meth)acrylic monomer {e.g., a polyfunctional (meth)acrylate [e.g., an alkylene poly(meth)acrylate such as butylene di(meth)acrylate; and a (poly)hydroxyalkane poly(meth)acrylate such as ethylene glycol di(meth)acrylate, butylene glycol di(meth)acrylate, poly(or oligo)ethylene glycol di(meth)acrylate (e.g., diethylene glycol di(meth)acrylate and triethylene glycol di(meth)acrylate), glycerin tri(meth)acrylate, trimethylolethane tri(meth)acrylate, trimethylolpropane di(meth)acrylate, trimethylolpropane tri(meth)acrylate, pentaerythritol di(meth)acrylate, pentaerythritol tetra(meth)acrylate, dipentaerythritol tetra(meth)acrylate, or dipentaerythritol hexa(meth)acrylate], a vinyl-series monomer (for example, vinyl(meth)acrylate and divinylbenzene); and glycidyl (meth)acrylate}, and a hydrolytically condensable compound having a polymerizable unsaturated bond [e.g., a silane coupling agent having a (meth)acryloyl group (e.g., a (meth)acryloyloxyalkyltrialkoxysilane such as 3-trimethoxysilylpropyl(meth)acrylate)], an allyl-series compound (e.g., allyl (meth)acrylate, diallyl malate, diallyl fumarate, diallyl itaconate, monoallyl malate, monoallyl fumarate, and triallyl (iso)cyanurate). These crosslinkable monomers may be used alone or in combination.

In the acrylic rubber, the proportion of the acrylic ester (particularly, the alkyl acrylate) may be about 50 to 100% by weight, preferably about 70 to 99% by weight, and more preferably about 80 to 98% by weight in the whole acrylic rubber. Moreover, in the acrylic rubber, the proportion of the crosslinkable monomer relative to 100 parts by weight of the acrylic ester may be about 0.1 to 10 parts by weight, preferably about 0.2 to 5 parts by weight, and more preferably about 0.3 to 5 parts by weight.

The diene-series rubber may include, for example, a polymer of a diene-series monomer (e.g., a natural rubber, an isoprene rubber, a butyl rubber, a butadiene rubber, and a chloroprene rubber), and a copolymer of a diene-series monomer and other unsaturated bond-containing monomer(s) (e.g., a copolymer (rubber) of acrylonitrile and a diene-series monomer, such as an acrylonitrile-butadiene rubber, a nitrile-chloroprene rubber, or a nitrile-isoprene rubber; and a copolymer (rubber) of styrene and a diene-series monomer, such as a styrene-butadiene rubber, a styrene-chloroprene rubber, or a styrene-isoprene rubber) The diene-series rubber may also include a hydrogenated rubber, for example, a hydrogenated nitrile rubber.

The silicon-containing rubber (silicone-series rubber) is usually an organopolysiloxane comprising a unit represented by the formula: $R_aSiO_{(4-a)/2}$. In the formula, the group R may include, for example, a $C_{1-10}$alkyl group such as methyl group, a halogenated $C_{1-10}$alkyl group such as trifluoropropyl group, a $C_{2-10}$alkenyl group such as vinyl group or allyl group, a $C_{6-12}$aryl group such as phenyl group, a $C_{3-10}$cycloalkyl group such as cyclopentyl group, and a $C_{6-12}$aryl-$C_{1-4}$alkyl group such as benzyl group. In the formula, the coefficient "a" is about 1.9 to 2.1. The preferable group R includes methyl group, phenyl group, an alkenyl group (e.g., vinyl group), and others. The silicone rubber may have the structural unit(s) alone or in combination.

The molecular structure of the silicone rubber is usually a straight chain structure, may partly have branched chain structure, or may be a branched chain structure. The main chain of the silicone rubber may comprise, for example, a dimethylpolysiloxane chain, a methylvinylpolysiloxane chain, a methylphenylpolysiloxane chain, a copolymer chain of these siloxane units [e.g., a dimethylsiloxane-methylvinylsiloxane copolymer chain, a dimethylsiloxane-methylphenylsiloxane copolymer chain, a dimethylsiloxane-methyl(3,3-trifluoropropyl)siloxane copolymer chain, and a dimethylsiloxane-methylvinylsiloxane-methylphenylsiloxane copolymer chain]. The both ends of the silicone rubber may be, for example, a trimethylsilyl group. Incidentally, such a silicone rubber is usually obtained by polymerizing (ring-opening polymerizing) an organosiloxane monomer. Such an organosiloxane may include an organosiloxane corresponding to the above-mentioned unit, for example, hexamethyltricyclosiloxane, octamethyltetracyclosiloxane, decamethylpentacyclosiloxane, dodecamethylhexacyclosiloxane, trimethyltriphenyltricyclosiloxane, tetramethyltetraphenyltetracyclosiloxane, and octaphenyltetracyclosiloxane.

Representatively, the core layer may comprise an acrylic rubber.

Incidentally, the core layer may contain a non-rubber component (for example, the later-mentioned hard resin component) as long as the core layer contains a rubber component as a main component. The proportion of the rubber component relative to the whole core layer may be about 30 to 100% by weight, preferably about 50 to 100% by weight, and more preferably about 70 to 100% by weight. Moreover, the structure of the core layer may be a uniform structure or a non-uniform structure (e.g., a salami structure).

In the core-shell polymer, the shell layer usually comprises a hard resin component (or a glassy resin component). The glass transition temperature of the hard resin component may be selected from the range of not lower than 0° C. (e.g., not lower than 20° C.), for example, not lower than 30° C. (e.g., about 30 to 300° C.), preferably not lower than 50° C. (e.g., about 60 to 250° C.), and more preferably not lower than 70° C. (e.g., about 80 to 200° C.). Such a hard resin component usually comprises a vinyl-series polymer (a polymer of a vinyl-series monomer). In the vinyl-series polymer (resin), the vinyl-series monomer (vinyl-series monomer) is not particularly limited to a specific one as long as the glass transition temperature of the vinyl-series polymer can be adjusted to the above range. The vinyl-series monomer (vinyl-series monomer) may include, for example, a methacrylic monomer [for example, a methacrylate such as an alkyl methacrylate (e.g., a $C_{1-20}$alkyl methacrylate such as methyl methacrylate, ethyl methacrylate, propyl methacrylate, butyl methacrylate, hexyl methacrylate, or 2-ethylhexyl methacrylate, preferably a $C_{1-10}$alkyl methacrylate, and more preferably a $C_{1-6}$alkyl methacrylate), an aryl methacrylate (e.g., phenyl methacrylate), or a cycloalkyl methacrylate (e.g., cyclohexyl methacrylate)], and the above-exemplified monomer [for example, an acrylic monomer, an aromatic vinyl-series monomer (e.g., the above-exemplified monomer such as styrene), an olefinic monomer, a vinyl cyanide-series monomer (e.g., the above-exemplified monomer such as (meth)acrylonitrile)]. These vinyl-series monomers may be used alone or in combination. The vinyl-series polymer is practically a polymer obtainable from at least one member selected from the group consisting of a methacrylic monomer, an aromatic vinyl-series monomer, and a vinyl cyanide-series monomer [particularly, for example, at least a methacrylate (e.g., an alkyl methacrylate such as methyl methacrylate)] as a polymerizing component.

Incidentally, the vinyl-series polymer constituting the shell layer may be a copolymer of a vinyl-series monomer and a crosslinkable monomer. The crosslinkable monomer may include the same monomers as described above.

The shell layer may be formed from a single layer or a plurality of layers as long as the shell layer coats part or all of the core layer.

The core layer and the shell layer are practically bonded to each other. Such a bond is not particularly limited to specific one and is usually formed by graft polymerization of the shell layer (the hard resin component, the vinyl-series polymer) to the core layer (the rubber component). For example, the core-shell polymer bonded (graft-bonded) by such a graft polymerization (graft copolymerization) is obtained by graft polymerization of the vinyl-series monomer constituting (or forming) the shell layer (vinyl-series polymer) to the rubber component. Incidentally, before the graft polymerization, if necessary, a group having a reactivity to the shell layer (or vinyl-series monomer) may be introduced to the rubber component constituting the rubber layer. The introduction of the reactive group may be, for example, conducted by allowing a graft-crossing agent having a reactive group to react a monomer constituting the rubber component when the monomer is polymerized. The graft-crossing agent for the silicon-containing rubber may include, for example, an organosiloxane having an unsaturated bond and/or a thiol group (for example, (meth)acroxysiloxane and vinylsiloxane).

In the core-shell polymer, the proportion of the core layer relative to the shell layer [the former/the latter (weight ratio)] may be about 99/1 to 1/99, preferably about 95/5 to 5/95, more preferably about 90/10 to 10/90, and usually about 95/5 to 30/70 (for example, 85/15 to 50/50).

The average particle size of the core-shell polymer (core-shell polymer particle) to be used in the present invention may usually be selected from the range of not smaller than 1 μm (e.g., about 1.2 to 30 μm). For example, the average particle size may be not smaller than 1.5 μm (e.g., about 1.8 to 20 μm), preferably not smaller than 2 μm (e.g., 2.5 to 15 μm), more preferably about 3 to 10 μm (e.g., about 3.5 to 8 μm), and particularly about 4 to 7.5 μm (e.g., about 4.5 to 7 μm). Incidentally, the core-shell polymer may usually be dispersed in the resin composition (or the PBT-series resin, the resin component comprising the PBT-series resin). Such a dispersed core-shell polymer may be a primary particle or a secondary particle. The average dispersion particle size of the core-shell polymer may be selected from the range similar to the range described above. Too small a particle size (e.g., smaller than 1 μm) decreases the laser transmissivity, whereby the laser weldability is deteriorated.

In the present invention, a core-shell polymer having a large particle size (or dispersion size) as mentioned above is usually employed. Incidentally, the commonly used core-shell polymer practically has a particle size in a 0.1 μm order. Moreover, the particle size of the commonly used thermoplastic elastomer (e.g., a polyolefinic thermoplastic elastomer, a styrene-series elastomer, and a polyester-series elastomer) is easily affected by the viscosity of the PBT-series resin, the kneading condition, or other conditions. Therefore, it is difficult to disperse the thermoplastic elastomer in the resin with maintaining its large particle size stably.

In the present invention, probably because use of the core-shell polymer, particularly a core-shell polymer having a large particle size or dispersion size as described above, can greatly inhibit scattering of a transmitted light, the laser transmissivity (or laser weldability) can be compatible with the heat shock resistance (thermal shock resistance). Moreover, the core-shell polymer can improve the laser transmissivity and heat shock resistance with maintaining original excellent properties of the PBT-series resin (e.g., heat resistance and solvent resistance) probably due to a large particle size thereof. Incidentally, in case of improving the heat shock resistance only, a core-shell polymer having a relatively small particle size is often used advantageously. The combination use of the PBT-series resin and the core-shell polymer having a relatively large particle size as described above imparts a high heat shock resistance to the composition of the present invention for laser-welding application without deterioration in the laser weldability and ensures laser weldability and heat shock resistance in a well-balanced way.

Incidentally, the refractive index of the core-shell polymer is not particularly limited to a specific one. In the present invention, the core-shell polymer having a large particle size is used. Therefore, the laser transmissivity (laser weldability) of the composition is not deteriorated even when the core-shell polymer does not have a specific refractive index (1.52 to 1.59) as described in the above-mentioned Patent Document 4 [for example, even when the core-shell polymer has a refractive index less than 1.52 (e.g., about 1.35 to 1.5, preferably about 1.4 to 1.49, and more preferably about 1.42 to 1.48)]. Incidentally, the core-shell polymer may be prepared through a conventional manner (for example, emulsion polymerization, seed polymerization, microsuspension polymerization, and suspension polymerization) by which a core layer and a shell layer can be formed, or a commercially available product may be used as the core-shell polymer. For example, the core-shell polymer having a large particle size is available as "PARALOID EXL5136" from Rohm and Haas Japan K.K.

The proportion of the core-shell polymer (B) relative to 100 parts by weight of the polybutylene terephthalate-series resin (A) may be, for example, about 1 to 50 parts by weight (e.g., about 2 to 50 parts by weight), preferably about 3 to 40 parts by weight (e.g., about 5 to 35 parts by weight), more preferably about 5 to 30 parts by weight, and particularly about 10 to 25 parts by weight. Moreover, the proportion of the core-shell polymer (B) relative to the whole resin composition may be, for example, about 1 to 30% by weight, preferably about 3 to 20% by weight, and more preferably about 5 to 15% by weight. Too small a proportion of the core-shell polymer (B) does not effectively improve the heat shock resistance. In contrast, too large a proportion easily induces the deterioration of the laser transmissivity.

(C) Filler

The resin composition of the present invention may contain (C) a filler (or reinforcing material) in order to impart a desired strength to the resin composition. Such a filler (C) may include a fibrous reinforcing material [for example, an inorganic fiber (e.g., a glass fiber, an asbestos fiber, a carbon fiber, a silica fiber, an alumina fiber, a silica-alumina fiber, an aluminum silicate fiber, a zirconia fiber, a potassium titanate fiber, a silicon carbide fiber, a whisker (e.g., a whisker of silicon carbide, alumina, boron nitride, or the like)) and an organic fiber (e.g., an aliphatic or aromatic polyamide, an aromatic polyester, a fluorine-containing resin, an acrylic resin such as a polyacrylonitrile, and a fiber formed from a rayon or the like)], a plate-like reinforcing material [for example, a talc, a mica, a glass flake, and a graphite], a particulate reinforcing material [for example, a glass bead, a glass powder (or a powdered glass), and a milled fiber (e.g., a milled glass fiber)], and a wollastonite. The wollastonite may be in the form of a plate, a column, a fiber, or others. The average diameter of the fibrous reinforcing material may be, for example, about 1 to 50 μm (preferably about 3 to 30 μm), and the average length of the fibrous reinforcing material may be, for example, about 100 μm to 3 mm (preferably about 300 μm to 1 mm, and more preferably about 500 μm to 1 mm). Moreover, the average particle size of the plate-like or particulate reinforcing material may be, for example, about 0.1 to 100 μm and preferably about 0.1 to 50 μm (e.g., about 0.1 to 10 μm) These fillers or reinforcing materials may be used alone or in combination.

Among these reinforcing materials, it is preferable to use the glass or glassy filler or reinforcing material (e.g., a glass fiber, a glass flake, and a glass bead), a talc, a mica, a wollastonite, a potassium titanate fiber, and others. In particular, the glassy filler such as a glass fiber is preferable. Among the glass fibers, particularly, a chopped strand product is preferably used due to a high strength and rigidity thereof.

The proportion of the filler (C) relative to 100 parts by weight of the polybutylene terephthalate-series resin (A) may be, for example, selected from the range of about 1 to 150 parts by weight (e.g., about 5 to 130 parts by weight). The proportion may usually be about 10 to 120 parts by weight (e.g., about 15 to 100 parts by weight), preferably about 20 to 90 parts by weight, and more preferably about 30 to 80 parts by weight (e.g., about 40 to 70 parts by weight).

(D) Resin (Second Resin)

The polybutylene terephthalate-series resin composition may further contain a thermoplastic resin (a second resin) in order to improve light transmissivity (or laser weldability). The second resin may include an amorphous resin, for example, a polycarbonate (PC)-series resin. These second resins (D) may be used alone or in combination. Incidentally, in the resin composition, the morphology of the polybutylene terephthalate-series resin (A) and the resin (D) is not particularly limited to a specific one, and the polybutylene terephthalate-series resin (A) and the resin (D) may form a uniform (or homogeneous) resin system or a dispersion system.

The polycarbonate-series resin may be obtained by a reaction of a dihydroxy compound with phosgene or a carbonic ester such as diphenyl carbonate. The dihydroxy compound may be an alicyclic compound, and is preferably an aromatic compound (in particular, a bisphenol compound).

The bisphenol compound may include the bisphenol compounds exemplified in the paragraph of the PBT-series resin [e.g., a bis(hydroxyaryl)$C_{1-6}$alkane; a bis(hydroxyaryl) $C_{4-10}$cycloalkane; 4,4'-dihydroxydiphenyl ether; 4,4'-dihydroxydiphenyl sulfone; 4,4'-dihydroxydiphenyl sulfide; and 4,4'-dihydroxydiphenyl ketone]. The preferred polycarbonate-series resin includes a bisphenol A-based polycarbonate.

Incidentally, the PC-series resin has a high compatibility with the polybutylene terephthalate-series resin (particularly, the PBT-series resin) and greatly improves the laser transmissivity of the resulting molded product. Moreover, the PC-series resin can reduce warps in the resulting molded product efficiently.

The amount to be used of the resin (D) (or PC-series resin) relative to 100 parts by weight of the polybutylene terephthalate-series resin (A) may be, for example, selected from the range of about 0 to 60 parts by weight (e.g., about 0.5 to 50 parts by weight), usually about 1 to 40 parts by weight (e.g., about 2 to 30 parts by weight), preferably not more than 25 parts by weight (e.g., about 3 to 20 parts by weight), and more preferably not more than 15 parts by weight (e.g., about 4 to 15 parts by weight). Moreover, the proportion of the resin (D) relative to the whole resin composition may be, for example, about 0 to 20% by weight (e.g., about 1 to 15% by weight), preferably about 2 to 10% by weight, and more preferably about 3 to 8% by weight. Too large an amount of the resin (D) tends to decrease the original properties of the polybutylene terephthalate-series resin (e.g., heat resistance and chemical resistance).

Various additives (e.g., a stabilizer and a moldability-improving material) may be added to the resin composition. For example, the additive may include a stabilizer (e.g., an antioxidant, an ultraviolet-ray absorbent, and a heat stabilizer), a nucleating agent, a flame retardant, a lubricant, a mold-release agent (or a releasing agent), an antistatic agent, a coloring agent (e.g., a dye or a pigment), and a dispersing agent. If necessary, other resins (e.g., a thermoplastic resin and a thermosetting resin) may be used in combination. Moreover, an epoxy compound (e.g., a bisphenol A-based epoxy compound and a novolak epoxy compound) may be added to the resin composition. The addition of the epoxy compound ensures further improvement of hydrolysis resistance, heat shock resistance, and others. Incidentally, a reflection component to laser beam (e.g., a component which reflects most of an incident light having a wavelength range of 800 to 1200 nm) may be added to the resin composition as long as the laser weldability of the resin composition is not deteriorated. Such a reflection component is not usually added to the resin composition.

The nucleating agent to be used may practically be an organic nucleating agent (such as a rosin) or an inorganic nucleating agent [for example, a metal oxide (e.g., a silica, an alumina, a zirconia, titanium oxide, iron oxide, and zinc oxide); a metal carbonate (e.g., calcium carbonate, magnesium carbonate, and barium carbonate); a plate-like inorganic substance or silicate (e.g., calcium silicate, aluminum silicate, and a talc); a metal carbide (e.g., silicon carbide); a metal nitride (e.g., silicon nitride, boron nitride, and tantalum nitride). These nucleating agents may be used alone or in combination. The nucleating agent may be a particulate or plate-like one.

The proportion of the nucleating agent relative to 100 parts by weight of the polybutylene terephthalate-series resin (A) may be about 0.001 to 5 parts by weight (e.g., about 0.01 to 5 parts by weight), preferably about 0.01 to 3 parts by weight (e.g., about 0.01 to 2 parts by weight), and more preferably about 0.01 to 1 part by weight (e.g., about 0.01 to 0.5 part by weight). The proportion of the nucleating agent relative to 100 parts by weight of the core-shell polymer (B) may be about 0.01 to 10 parts by weight, preferably about 0.05 to 5 parts by weight (e.g., about 0.05 to 2.5 parts by weight), and more preferably about 0.1 to 1 part by weight (e.g., about 0.1 to 0.5 part by weight).

The PBT-series resin composition of the present invention may be a particulate mixture or a molten mixture (e.g., a pellet). The resin composition of the present invention has a high moldability and can produce a molded article or molded product having a high mechanical strength or a high heat resistance. In particular, although the molded product formed from the resin composition of the present invention comprises the PBT-series resin composition, the molded product has a high light transmissivity (particularly, laser light transmissivity) and is suitable for laser welding. For example, an injection-molded product having a thickness of 1.5 mm may have a transmittance of not less than 18% (e.g., about 19 to 70%), preferably not less than 20% (e.g., about 21 to 60%), and more preferably not less than 22% (e.g., about 23 to 50%), with respect to a light having a wavelength of 800 to 1000 nm. Further, since the resin composition of the present invention has a high laser-weldability, the resin composition is useful for producing a molded product to be welded by laser beam. Furthermore, since the resin composition comprises the PBT-series resin and the specific elastomer in combination, the resin composition has an improved laser weldability and heat shock resistance with maintaining the original properties of the PBT-series resin (e.g., heat resistance and solvent resistance).

[Molded Product]

The molded product of the present invention is formed from the above-mentioned resin composition and has an excellent laser light transmissivity. Such a molded product may be produced by subjecting a resin composition comprising the polybutylene terephthalate-series resin (A) and the core-shell polymer (B), and if necessary, the reinforcing material (C) and/or the resin (D) to a conventional molding manner, for example, (1) a process comprising mixing components with each other, kneading and extruding the resulting mixture into pellets with a single screw or twin screw extruder, and molding a product from the pellets, (2) a process comprising once making pellets (master batch) different in formulation, mixing (diluting) the pellets in a certain ratio, and molding a product having a certain formulation from the resulting pellets, (3) a process comprising directly feeding one or not less than two of the components in a molding machine, and others. Incidentally, the pellets may be prepared by melt-mixing all components other than a fragile component (e.g., a glassy reinforcing material), and then mixing the fragile component (e.g., a glassy reinforcing material) to the mixture.

The molded product may be formed by melt-kneading the polybutylene terephthalate-series resin composition and subjecting the kneaded matter to a conventional manner such as an extrusion molding, an injection molding, a compression molding, a blow molding, a vacuum molding, a rotational molding, or a gas injection molding. The molded product is usually formed by an injection molding. In particular, the resin composition of the present invention is suitable for insert molding because of a high heat shock resistance thereof. Therefore, the molded product may be an insert-molded product (a molded product formed by an insert molding).

The shape (or configuration) of the molded product is not particularly limited to a specific one. Since the molded product is bonded to a counterpart material (other molded product formed from a resin) by a welding with a laser, the molded product usually has a shape having at least a contact surface (e.g., a flat surface), for example, a plate-like form. Moreover, the molded product of the present invention has a high laser beam transmittance (or penetrability), and the thickness of the laser beam-transmitting site in the molded product (the thickness in the laser beam-transmitting direction) may be selected from a wide range, for example, may be about 0.1 to 5 mm and preferably about 0.1 to 3 mm (for example, about 0.5 to 3 mm).

The light source of the laser beam is not particularly limited to a specific one, and may include, for example, a dye laser, a gas laser, (e.g., an excimer laser, an argon laser, a krypton laser, and a helium-neon laser), a solid-state laser (e.g., a YAG laser), a semiconductor laser (or laser diode), and others. A pulsed laser is usually employed as the laser beam.

The present invention also discloses a composite molded product obtained by laser welding. In the composite molded product, a molded product (a first molded product, a laser-transmittable resin molded product) formed from the polybutylene terephthalate-series resin composition and a resin molded product (a second molded product, an adherend, that is, a molded product formed from a laser-absorbable resin) as a counterpart are bonded and united by a laser welding. For example, two molded products (first and second molded products) can be bonded and united with each other according to the following manner to give a single composite (or united) product: bringing the first molded product and the second molded product into contact (particularly, at least regions or areas to be joined of both products) with each other, melting at least part of the contact surface between the first and second molded products by a laser irradiation to adhere these product to each other, and cooling the first and second molded products (or allowing the first and second molded products to cool) Use of the molded product of the present invention for such a composite molded product ensures a high bonded strength by a welding, and such a bonded strength is as high as the strength of a non-welded molded product.

The resin constituting the resin molded product (the laser-absorbable resin) as the counterpart is not particularly limited to a specific one, and may include various thermoplastic resins, for example, a styrenic resin, an acrylic resin, a polyester-series resin, a polyamide-series resin, a polycarbonate-series resin, a mixture thereof [or an alloy thereof, e.g., an alloy of a styrenic resin (a rubber-containing styrenic resin such as an ABS resin or an AS resin) and a polyester resin]. Among these resins, the laser-absorbable molded product may comprise the same kind or type of resin as the resin constituting the polybutylene terephthalate-series resin composition (e.g., a polyester-series resin such as a PBT-series resin or a PET-series resin (an aromatic polyester-series resin), a polycarbonate-series resin, and a styrenic resin), or a composition thereof. For example, each of the first and second molded products may be formed from the PBT-series resin (or a composition thereof).

The adherend may contain an absorbent for a laser beam or a coloring agent. The coloring agent may be selected depending on the wavelength of the laser beam, and may include an inorganic pigment [for example, a black pigment such as a carbon black (e.g., an acetylene black, a lampblack, a thermal black, a furnace black, a channel black, and Ketjen black), a red pigment (such as an iron oxide red), an orange pigment (such as a molybdate orange), and a white pigment (such as titanium oxide)], an organic pigment (e.g., a yellow pigment, an orange pigment, a red pigment, a blue pigment, and a green pigment), and others. Incidentally, a commercially available product such as "Clearweld" (manufactured by GENTEX Corporation, a near-infrared light-absorbing material) may be used as the laser absorbent. These absorbents may be used alone or in combination.

The irradiation of the laser beam is usually conducted in the direction from the first molded product toward the second molded product. The first and second molded products are welded to each other by generation of heat in the interface of the second molded product containing the absorbent or the coloring agent. Incidentally, if necessary, with the use of a lens system, the contact surface between the first and second molded products may be welded by focusing the laser beam on the interface.

INDUSTRIAL APPLICABILITY

The composite molded product in the present invention has a high welding strength and a high heat shock resistance while retaining the properties of the polybutylene terephthalate-series resin (particularly the PBT-series resin) and has less extent of the damage of the polybutylene-terephthalate-series resin by laser beam irradiation. Therefore, the composite molded product can be applied to various applications, for example, an electric or electronic device part, an office automation (OA) device part, a household electrical appliance part, a mechanical device part, an automotive part, and others. In particular, the composite molded product can be preferably utilized for an automotive electrical component or part (e.g., various control units, and an ignition coil part), a motor part, various sensor parts, a connector part, a switch part, a relay part, a coil part, a transformer part, a lamp part, and others.

EXAMPLES

The following examples are intended to describe this invention in further detail and should by no means be interpreted as defining the scope of the invention.

Examples 1 to 5 and Comparative Examples 1 to 3

In Examples and Comparative Examples, the following PBT-series resins (A), elastomers (B), fillers (C), resins (D) and additives were used.

PBT-Series Resin (A)

(A-1) PBT resin: Polybutylene terephthalate (manufactured by Win Tech Polymer Ltd., DX2000)

(A-2) Modified PBT Resin: PBT Resin Modified with Dimethyl Isophthalate (DMI)

In a reaction of terephthalic acid with 1,4-butanediol, dimethyl isophthalate (DMI) (12.5% by mol) was used as a copolymerizable component in place of some amount of terephthalic acid (12.5% by mol), and a modified polybutylene terephthalate (A-2) was prepared.

Core-Shell Elastomer (B)

(B-1) Acrylic core-shell polymer (manufactured by Rohm and Haas Japan K.K., PARALOID EXL5136)

(B-2) Acrylic core-shell polymer (manufactured by Rohm and Haas Japan K.K., PARALOID EXL2311)

(B-3) Acrylic core-shell elastomer (manufactured by Arkema K.K., Durastrength D400R)

Inorganic Filler (C)

(C-1) Glass fiber (manufactured by Nitto Boseki Co., Ltd., "CS3J-948S", average fiber diameter $\phi$11 μm, chopped strand, average fiber length 400 μm)

Thermoplastic Resin (D)

(D-1) PC: Polycarbonate resin (manufactured by Teijin Chemicals Ltd., "PANLITE L-1225")

Components were kneaded by using a twin screw extruder (manufactured by Japan Steel Works, Ltd., 30 mm$\phi$) at 250° C. in a proportion shown in Table 1 to prepare pellets. Then obtained pellets were injection-molded by an injection molding machine (manufactured by Toshiba Corporation) under a condition of a cylinder temperature of 260° C. and a mold temperature of 80° C. to produce a sheet-like molded product of 8 cm in length, 8 cm in width and 1.5 mm in thickness. The sheet-like molded product was cut into rectangular slices of 10 mm in width to produce a test piece A (that is, the test piece of 8 cm in length, 1 cm in width and 1.5 mm in thickness).

In addition, a test piece B having the same shape as the test piece A (that is, the test piece B of 8 cm in length, 1 cm in width and 1.5 mm in thickness) was produced as an adherend (a laser-absorbable material) to be welded to the test piece A by using a PBT resin (manufactured by Win Tech Polymer Ltd., "DURANEX 3300" (ED3002)). Incidentally, the test piece B serves as a heating element by laser beam (laser-absorbable material).

As shown in FIG. 1, part of the test piece A (3) was put on the test piece B (4) to bring the test piece A into contact with the test piece B. With the use of a laser-welding machine (manufactured by Leister Process Technologies), a laser beam (2) from a light source or laser emitter (1) was focused or condensed on the contact surface between the test pieces A and B in an irradiation width or line width w (2 mm). The side of the test piece A (3) was irradiated with a laser beam (2) having a wavelength of 940 nm to weld the test pieces under the conditions of a laser output of 10 to 50 W and a scanning rate of 30 mm/second. Incidentally, the welding strength shown in Table 1 indicated the maximum welding strength value measured in welding at a laser output of 10 to 50 W.

(1) Measurement of Welding Strength

The test piece A and the test piece B which had been bonded together by laser welding were pulled by using a tensile tester (manufactured by Orientec Co., Ltd., RTC-1325PL) at a rate of 10 mm/minute, and the welding strength was determined.

(2) Laser Light Transmittance

The laser light transmittance of the test piece A was measured at a wavelength of 940 nm by using a spectrophotometer (manufactured by JASCO Corporation, V570).

(3) Average Dispersion Particle Size of Core-Shell Elastomer

The central region of the test piece A was cut, and the cut part was immersed in xylene at 115° C. for 2.5 hours for etching. Then three measuring points of the central area in the thickness direction of the cut part were fracture-observed by an electron microscope. With respect to each observed point, a diameter of a pore formed by elimination of the core-shell elastomer was regarded as a particle size (dispersion size), and random 10 dispersion sizes were measured to determine the average dispersion particle size of the 10 dispersion sizes.

(4) Thermal Shock Resistance Property (Thermal Cycling Property)

The pellets were subjected to an insert-injection molding under the condition of at a resin temperature of 270° C., a mold temperature of 65° C., an injection time of 25 seconds, and a cooling time of 10 seconds so that the minimum thickness of part of the resin molded region become 1 mm, and an insert-molded product was produced. In the insert-injection molding, a mold used for test piece molding was a prism-shaped mold of 22 mm in length, 22 mm in width, and 51 mm in height having an iron core of 18 mm in length, 18 mm in width, and 30 mm in height provided therein. Using a thermal shock tester, the resulting insert-molded product was heated at 140° C. for an hour and a half and then cooled to −40° C. and maintained at −40° C. for an hour and a half, and then heated at 140° C.; let this thermal shock process be one cycle, and a thermal shock resistance test was performed. The number of cycles conducted before the molded product cracked was counted to evaluate the thermal shock resistance.

The results of Examples and Comparative Examples are shown in Table 1.

TABLE 1

|  |  | Examples | | | | Comparative Examples | | |
| --- | --- | --- | --- | --- | --- | --- | --- | --- |
|  |  | 1 | 2 | 3 | 4 | 1 | 2 | 3 |
| (A) PBT-series resin | A-1 | 60 | — | 30 | 55 | 60 | 60 | 70 |
|  | A-2 | — | 60 | 30 | — | — | — | — |
| (B) Core-shell elastomer | B-1 | 10 | 10 | 10 | 10 | — | — | — |
|  | B-2 | — | — | — | — | 10 | — | — |
|  | B-3 | — | — | — | — | — | 10 | — |
| (C) Filler | C-1 | 30 | 30 | 30 | 30 | 30 | 30 | 30 |
| (D) Thermoplastic resin | D-1 | — | — | — | 5 | — | — | — |
| Welding strength (N) |  | 700 | 700 | 700 | 800 | 0 | 0 | 800 |
| Laser light transmittance (940 nm) (%) |  | 24 | 24 | 24 | 26 | 13 | 15 | 27 |
| Average dispersion particle size (μm) |  | 4 to 5 | 4 to 5 | 4 to 5 | 4 to 5 | 0.3 to 0.6 | 0.6 to 0.7 | — |
| Thermal cycling (number of cycles) |  | 400 | 500 | 400 | 200 | 500 | 400 | 30 |

The invention claimed is:

1. A composite molded product comprising:
   (1) a laser-transmittable resin molded product formed from a laser-weldable resin composition, and
   (2) a molded product formed from a laser-absorbable resin, wherein the molded products (1) and (2) are bonded together by laser welding, the laser-weldable resin composition comprising (A) a polybutylene terephthalate-series resin and (B) a core-shell polymer,
   the core-shell polymer (B) has an average particle size of not less than 2 μm, and the proportion of the core-shell polymer (B) is 5 to 30 parts by weight relative to 100 parts by weight of the resin (A).

2. A composite molded product according to claim 1, wherein the polybutylene terephthalate-series resin (A) comprises a homopolyester, a copolyester modified with a copolymerizable monomer in a proportion of not more than 45 mol %, or a mixture thereof.

3. A composite molded product according to claim 1, wherein the core-shell polymer (B) comprises a core comprising an acrylic rubber.

4. A composite molded product according to claim 1, wherein the core-shell polymer (B) has an average particle size of 3 to 10 μm, and the proportion of the core-shell polymer (B) is 5 to 30 parts by weight relative to 100 parts by weight of the resin (A).

5. A composite molded product according to claim 1, wherein the laser-weldable resin composition further comprises (C) a reinforcing agent.

6. A composite molded product according to claim 5, wherein the proportion of the reinforcing agent (C) is 10 to 120 parts by weight relative to 100 parts by weight of the resin (A).

7. A composite molded product according to claim 1, wherein the laser-weldable resin composition further comprises a polycarbonate-series resin.

8. A composite molded product according to claim 7, wherein the proportion of the polycarbonate-series resin is 3 to 20 parts by weight relative to 100 parts by weight of the resin (A).

* * * * *